(12) United States Patent
Asukai

(10) Patent No.: US 11,341,148 B2
(45) Date of Patent: *May 24, 2022

(54) INFORMATION PROCESSING SYSTEM AND INFORMATION PROCESSING METHOD TO SPECIFY PERSONS WITH GOOD AFFINITY TOWARD EACH OTHER

(71) Applicant: SONY CORPORATION, Tokyo (JP)

(72) Inventor: Masamichi Asukai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 44 days.

This patent is subject to a terminal disclaimer.

(21) Appl. No.: 16/891,478

(22) Filed: Jun. 3, 2020

(65) Prior Publication Data

US 2020/0293526 A1    Sep. 17, 2020

Related U.S. Application Data

(63) Continuation of application No. 15/763,927, filed as application No. PCT/JP2016/070126 on Jul. 7, 2016, now Pat. No. 10,754,864.

(30) Foreign Application Priority Data

Oct. 13, 2015    (JP) .................................. 2015-202104

(51) Int. Cl.
*G06F 16/24*    (2019.01)
*G06F 16/2458*    (2019.01)
(Continued)

(52) U.S. Cl.
CPC ...... *G06F 16/2465* (2019.01); *G06F 16/2474* (2019.01); *G06F 16/436* (2019.01);
(Continued)

(58) Field of Classification Search
None
See application file for complete search history.

(56) References Cited

U.S. PATENT DOCUMENTS 9,087,131 B1 * 7/2015 Gundotra .............. G06F 16/951
2007/0282621 A1 * 12/2007 Altman .................. G06F 16/436
(Continued)

FOREIGN PATENT DOCUMENTS

JP    2007-034519 A    2/2007
JP    2009-230363 A    10/2009
(Continued)

OTHER PUBLICATIONS

Non-Final Office Action for U.S. Appl. No. 15/763,927, dated Dec. 2, 2019, 16 pages.
(Continued)

*Primary Examiner* — Son T Hoang
(74) *Attorney, Agent, or Firm* — Chip Law Group

(57) ABSTRACT

An information processing system including an acquisition unit that acquires time-series data representing vital sign information of a plurality of persons who share a location in a predetermined time, and a control unit that specifies persons who have a same or similar emotional response as persons having a good affinity with each other in accordance with the time-series data acquired by the acquisition unit.

15 Claims, 16 Drawing Sheets

(51) Int. Cl.
- *G06K 9/00* (2022.01)
- *G10L 17/00* (2013.01)
- *G06F 16/435* (2019.01)
- *G06F 16/583* (2019.01)
- *G10L 25/63* (2013.01)

(52) U.S. Cl.
CPC ....... *G06F 16/583* (2019.01); *G06K 9/00302* (2013.01); *G06K 9/00677* (2013.01); *G10L 17/00* (2013.01); *G10L 25/63* (2013.01)

(56) References Cited

U.S. PATENT DOCUMENTS

| | | | | |
|---|---|---|---|---|
| 2008/0240379 | A1* | 10/2008 | Maislos | G06F 16/748 |
| 2010/0205541 | A1* | 8/2010 | Rapaport | G06F 16/285 |
| 2013/0185368 | A1* | 7/2013 | Nordstrom | G06F 16/583 |
| 2015/0242443 | A1* | 8/2015 | Grue | G06F 16/9535 |
| | | | | 707/727 |
| 2015/0248651 | A1* | 9/2015 | Akutagawa | G06F 16/2465 |
| 2015/0294138 | A1* | 10/2015 | Barak | G06F 16/583 |

FOREIGN PATENT DOCUMENTS

| | | |
|---|---|---|
| JP | 2010-016796 A | 1/2010 |
| JP | 2011-070277 A | 4/2011 |
| JP | 2011-082915 A | 4/2011 |
| JP | 2011-128790 A | 6/2011 |
| JP | 2013-003635 A | 1/2013 |

OTHER PUBLICATIONS

Notice of Allowance for U.S. Appl. No. 15/763,927, dated Mar. 13, 2020, 19 pages.

International Search Report and Written Opinion of PCT Application No. PCT/JP2016/070126, dated Aug. 23, 2016, 09 pages of English Translation and 07 pages of ISRWO.

International Preliminary Report on Patentability of PCT Application No. PCT/JP2016/070126, dated Apr. 26, 2018, 10 pages of English Translation and 05 pages of IPRP.

Office Action for JP Patent Application No. 2017-545102 dated Jan. 12, 2021, 04 pages of Office Action and 04 pages of English Translation.

Office Action for JP Patent Application No. 2017-545102 dated Aug. 3, 2021, 5 pages of Office Action and 5 pages of English Translation.

* cited by examiner

FIG. 5
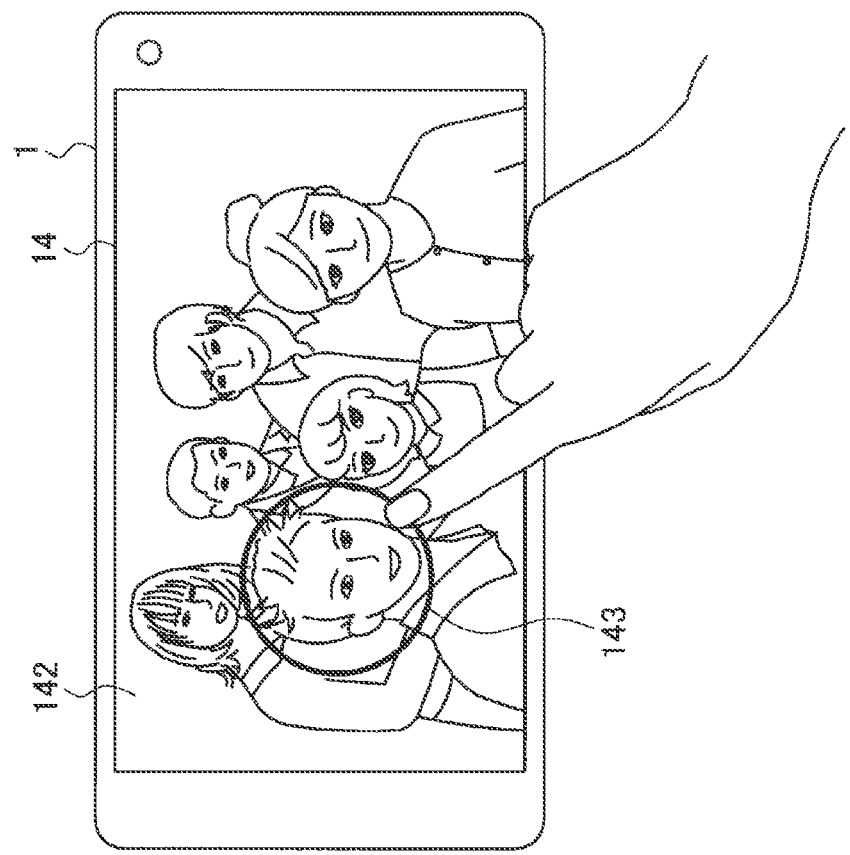
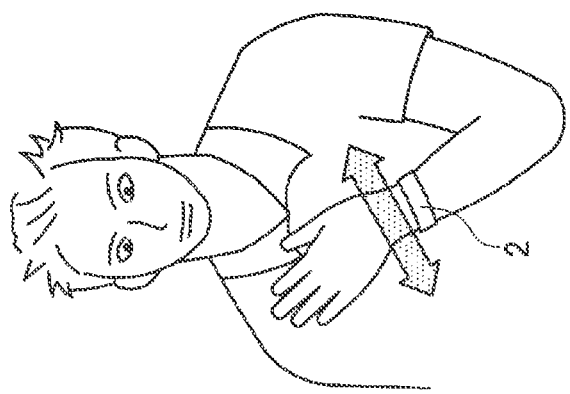

FIG. 7
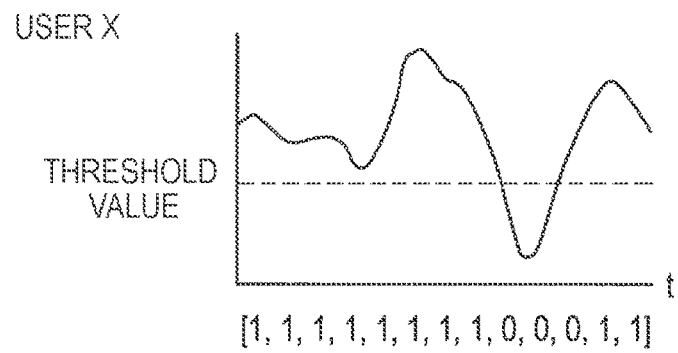
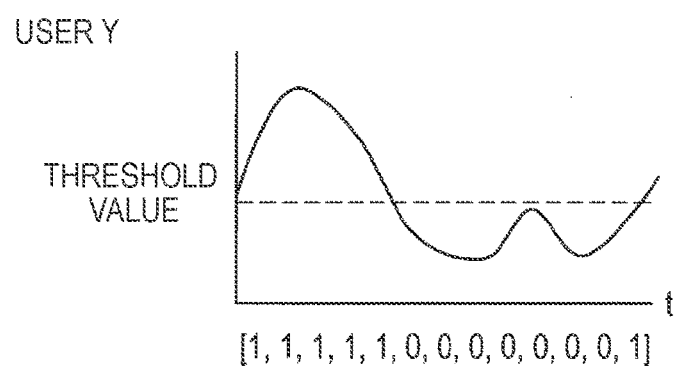
FIG. 8
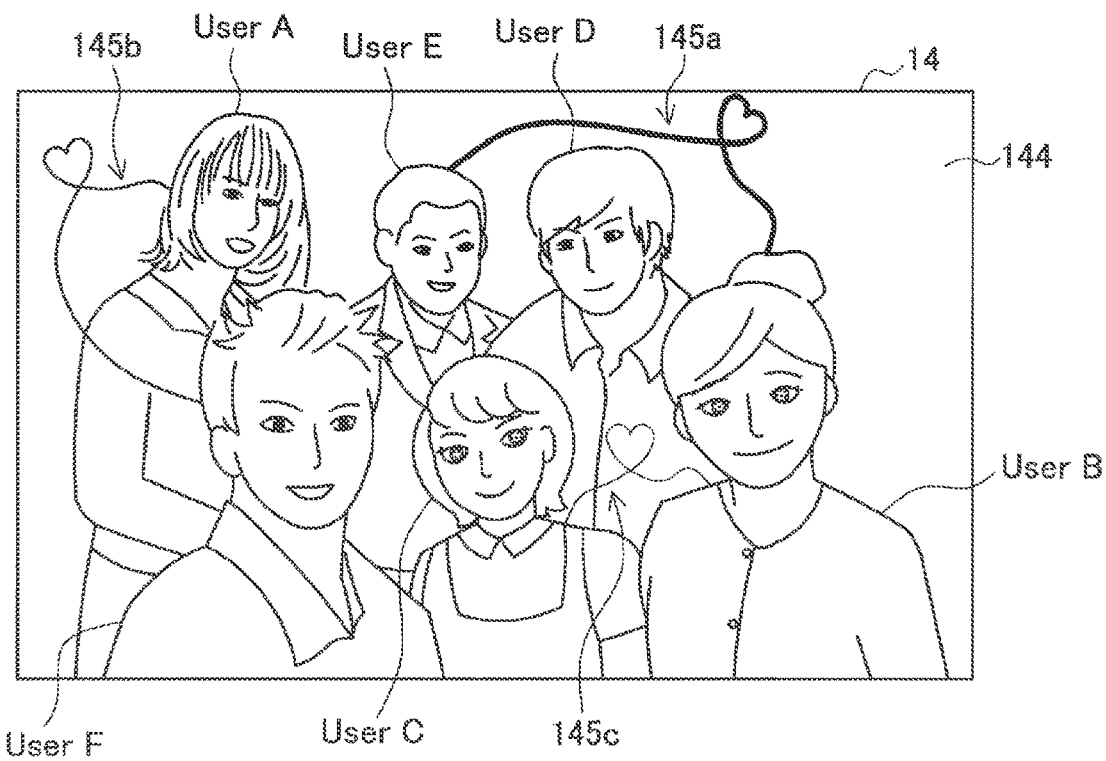

INFORMATION PROCESSING SYSTEM AND INFORMATION PROCESSING METHOD TO SPECIFY PERSONS WITH GOOD AFFINITY TOWARD EACH OTHER

CROSS-REFERENCE TO RELATED APPLICATION

The present application is a continuation application of U.S. patent application Ser. No. 15/763,927, filed Mar. 28, 2018, now U.S. Pat. No. 10,754,864, which is a National Stage of PCT/JP2016/070126, filed Jul. 7, 2016, and claims priority from prior Japanese Priority Patent Application JP 2015-202104 filed in the Japan Patent Office on Oct. 13, 2015, the entire content of which is hereby incorporated by reference.

TECHNICAL FIELD

The present disclosure relates to an information processing system, an information processing method, and a storage medium.

BACKGROUND ART

Although an affinity between persons are caused by empathy of having the same emotion with respect to the same target, senses of values, characters, and the like, it takes a long time to know whether or not a mutual affinity is good, and it is not possible to precisely know it merely from a several-hour interaction, for example.

In relation to technologies of extracting and visualizing relations between humans, Patent Literature 1 below, for example, describes a relation diagram that represents mutual intimacies, which have been calculated on the basis of smiling levels of respective persons who appear in an image together by processing image data, by distances and also describes a time-series change diagram of the relation diagram.

CITATION LIST

Patent Literature

Patent Literature 1: JP 2013-3635A

DISCLOSURE OF INVENTION

Technical Problem

However, it is difficult to precisely calculate relations between persons based merely on the smiling levels in an image captured at a specific timing.

Thus, the present disclosure proposes an information processing system, an information processing method, and a storage medium capable of more precisely specifying an affinity between persons by using time-series data.

Solution to Problem

According to the present disclosure, there is provided an information processing system including: an acquisition unit that acquires time-series data representing vital sign information of a plurality of persons who share a location in a predetermined time; and a control unit that specifies persons who have a same or similar emotional response as persons having a good affinity with each other in accordance with the time-series data acquired by the acquisition unit.

According to the present disclosure, there is provided an information processing method including: acquiring, by a processor, time-series data representing vital sign information of a plurality of persons who share a location in a predetermined time; and specifying, by a processor, persons who have a same or similar emotional response as persons having a good affinity with each other in accordance with the acquired time-series data.

According to the present disclosure, there is provided a storage medium that stores a program for causing a computer to function as: an acquisition unit that acquires time-series data representing vital sign information of a plurality of persons who share a location in a predetermined time; and a control unit that specifies persons who have a same or similar emotional response as persons having a good affinity with each other in accordance with the time-series data acquired by the acquisition unit.

Advantageous Effects of Invention

According to the present disclosure, it is possible to more precisely specify an affinity between persons by using time-series data as described above.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 5 is a diagram for explaining a method of linking IDs according to the embodiment.

FIG. 7 is a diagram for explaining a case in which affinity levels are calculated by using co-occurrence rates according to the embodiment.

FIG. 8 is a diagram illustrating an example of an affinity level determination result screen according to the embodiment.

MODE(S) FOR CARRYING OUT THE INVENTION

Figure 1:
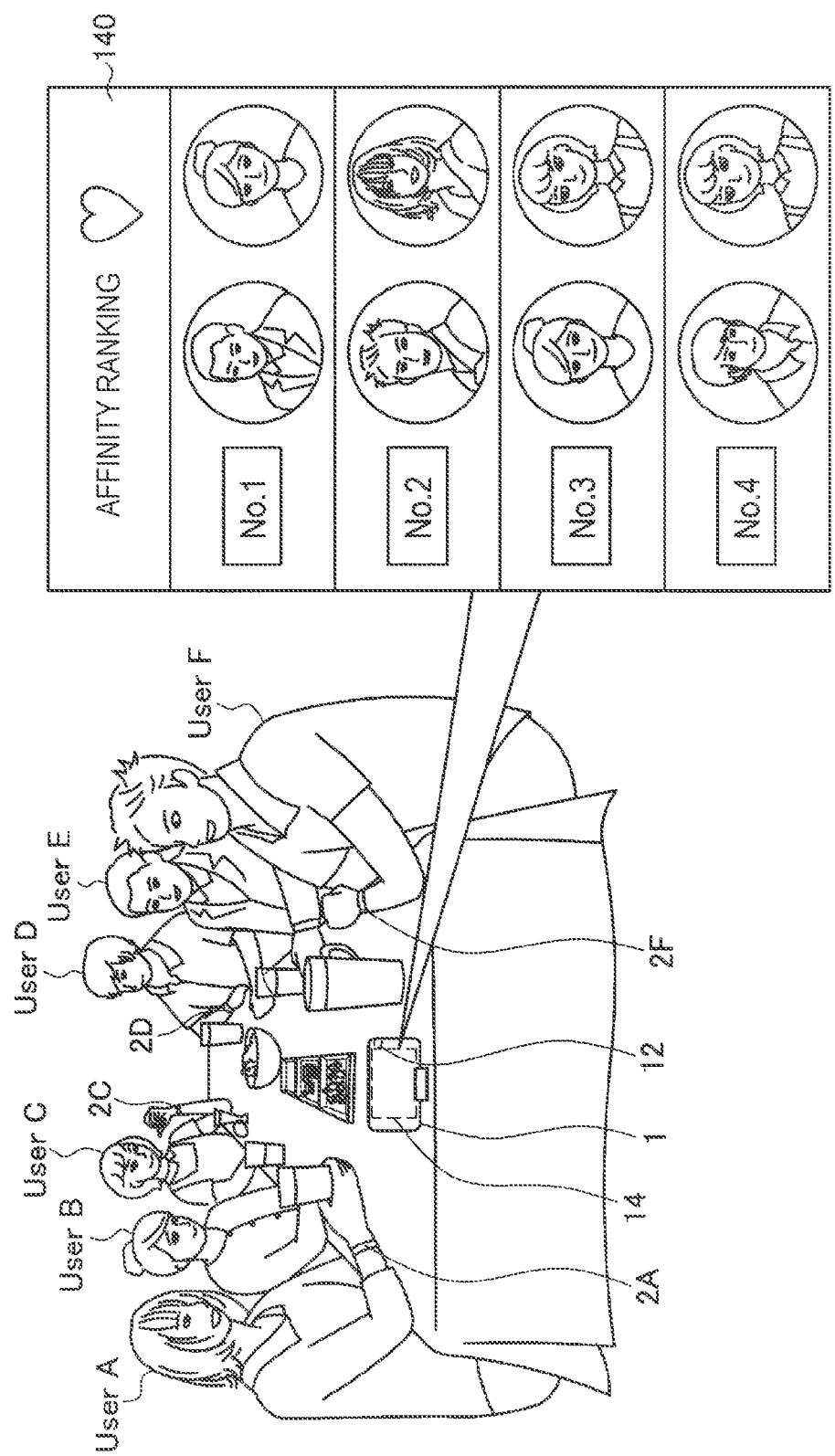
FIG. 1 is a diagram for explaining an outline of an information processing system according to the embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.
In addition, description will be provided in the following order.
1. Outline of information processing system according to one embodiment of present disclosure
2. Configuration
2-1. Configuration of information processing apparatus 1
2-2. Configuration of wearable terminal 2
3. Operation processing
4. Application examples
5. Conclusion <<1. Outline of Information Processing System According to One Embodiment of Present Disclosure>>

An information processing system according to an embodiment enables more precise specification of an affinity between persons by using time-series data representing vital sign information of a plurality of persons who share a location in a predetermined time (that is, who share the same experience).

FIG. 1 is a diagram for explaining an outline of the information processing system according to the embodiment. First, vital sign information of a plurality of persons (users A to F) in a predetermined time is acquired by wearable terminals 2 that the respective persons are wearing in a situation in which the plurality of persons share a location as illustrated in FIG. 1, and is then transmitted to an information processing apparatus 1. The information processing apparatus 1 calculates affinity levels between the respective persons on the basis of time-series data of the plurality of respective persons and specifies persons having a good affinity with each other. More specifically, the information processing apparatus 1 obtains cross-correlations of the time-series data and specifies persons who have a same or similar emotional response as persons having a good affinity with each other. The information processing apparatus 1 can be realized as a smartphone, a mobile phone terminal, a tablet terminal, or a personal computer (PC), or the like, for example. In addition, the wearable terminals can be realized by smart watches, smart bands, smart eye glasses, smart necks, or body implantable terminals, or the like, for example.

Here, the time-series data of the vital sign information used in determining the affinity includes motion, vibration, pulses, pulse waves, heart rates, amounts of sweating, aspiration, blood pressures, body temperatures, or the like. Also, the time-series data of the vital sign information may include captured images or voice data. The captured images or the voice data of the plurality of persons can be acquired by a camera 12 or a microphone 13 provided in the information processing apparatus 1 placed on a table as illustrated in FIG. 1, for example.

Results of the affinity determination by the information processing apparatus 1 are displayed as an affinity ranking screen 140 as illustrated in FIG. 1, for example, on a display unit 14. In the affinity ranking screen 140, a predetermined number of persons with a relatively good affinity from the top (pairs with high affinity levels), for example, are displayed in a ranking form with face images thereof.

As described above, it is possible to continuously acquire the vital sign information of the plurality of persons by the wearable terminals 2 and the information processing apparatus 1 and to more precisely obtain an affinity based on empathy in accordance with mutual relations of the time-series data of the vital sign information in a predetermined time when the plurality of persons share the location and the same experience. In the example illustrated in FIG. 1, for example, it is possible to recognize an affinity in communication by continuously acquiring the vital sign information such as voice data, facial expressions, body motion, and pulses when the plurality of persons are chatting and performing affinity diagnosis. Also, it is possible to recognize an affinity in content viewing in a case in which the vital sign information such as voice data, facial expressions, body motion, and pulses is continuously acquired when the plurality of persons are viewing content such as a TV program or a movie together, and affinity diagnosis is performed.

The outline of the information processing system according to the embodiment has been described above. Next, a configuration and operation processing of the information processing system according to the embodiment will be specifically described.

<<2. Configuration>>

Figure 2:
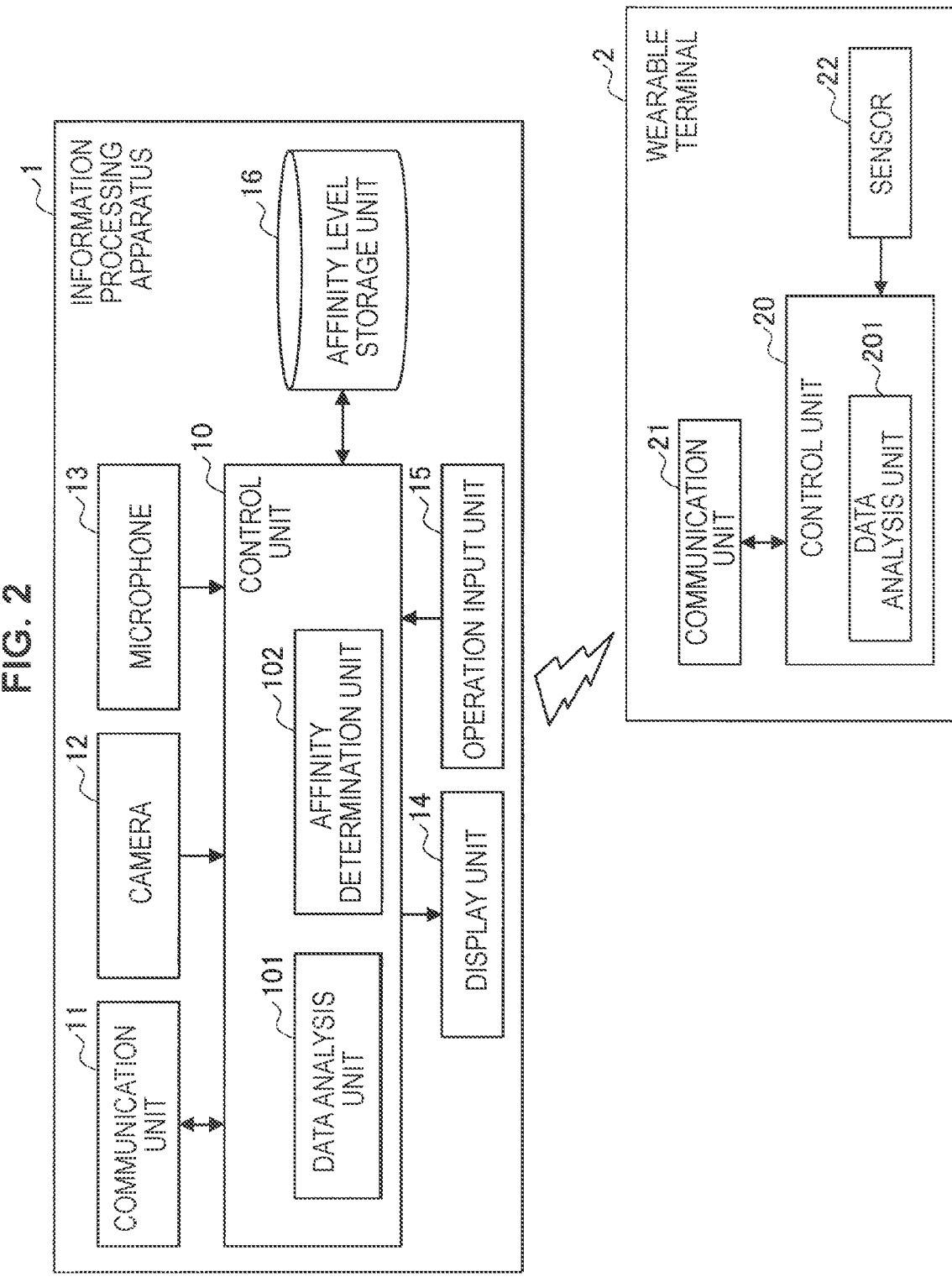
FIG. 2 is a diagram for explaining a configuration of the information processing system according to the embodiment.

FIG. 2 is a diagram for explaining a configuration of the information processing system according to the embodiment. As illustrated in FIG. 2, the information processing system according to the embodiment includes the information processing apparatus 1 and the wearable terminals 2. Both are connected in a wireless or wired manner and can transmit and receive data. Hereinafter, configurations of the information processing apparatus 1 and the wearable terminals 2 will be specifically described.

<2-1. Configuration of Information Processing Apparatus 1>

As illustrated in FIG. 2, the information processing apparatus 1 has a control unit 10, a communication unit 11, a camera 12, a microphone 13, a display unit 14, an operation input unit 15, and an affinity level storage unit 16.

The communication unit 11 transmits and receives data to and from an external device in a wired/wireless manner. For example, the communication unit 11 connects to the wearable terminals 2 and receives the time-series data of the vital sign information detected by the wearable terminals 2. In addition, the communication unit 11 may receive data analysis results (parameters) of the time-series data of the vital sign information detected by the wearable terminals 2.

The control unit 10 functions as a computation processing device and a control device and controls overall operations in the information processing apparatus 1 in accordance with various programs. The control unit 10 is realized by an electronic circuit such as a central processing unit (CPU) or a microprocessor, for example. In addition, the control unit 10 according to the embodiment functions as a data analysis unit 101 and an affinity determination unit 102.

The data analysis unit 101 analyzes the time-series data of the vital sign information acquired from the plurality of persons and calculates parameters. In a case in which the time-series data is captured image data, for example, the data analysis unit 101 detects face images from captured image data and calculates time-series data of face expression parameters of faces (for example, smiling levels, surprise levels, anger levels, fear levels, and the like). In addition, the data analysis unit 101 performs speaker recognition and voice recognition and calculates time-series data of parameters in speech of the respective speakers (for example, excitement, surprise, laughing, short responses or the like) in a case in which the time-series data is voice data. In addition, the data analysis unit 101 can analyze time-series data of vital sign information detected by the wearable terminals 2 in the similar manner. In a case in which the time-series data is acceleration data or vibration data, for example, the data analysis unit 101 calculates time-series data of parameters of motion or vibration of the persons (for example, motion of arms, swinging of bodies, nodding, or the like).

The affinity determination unit 102 specifies, as a person with a good affinity, a person who has the same or similar emotional response as or to that of a specific person in accordance with the time-series data of the parameters obtained by the data analysis unit 101 or the time-series data of the parameters received from the wearable terminals 2 by the communication unit 11. Specifically, the affinity determination unit 102 obtains cross-correlations in the time-series data of the parameters and specifies a person who has the same or similar emotional response. The cross-correlations of the time-series of the parameters can be calculated as affinity levels, for example. A method of calculating the affinity levels will be described later with reference to FIGS. 6 and 7.

Although the functions of the control unit 10 have been specifically described above, the functions of the control unit 10 are not limited thereto, and the control unit 10 can also link IDs of the wearable terminals 2 in the vicinity with IDs of the respective persons, generate an affinity determination result screen, and control display of the affinity determination result screen, and the like, for example. Also, the control unit 10 can perform control to transmit at least a part of the affinity determination result screen to another information processing apparatus in response to a user's operation.

The camera 12 images the vicinity and outputs captured images to the control unit 10. For example, the camera 12 continuously images a plurality of persons who share a location and passes time-series captured image data to the control unit 10.

The microphone 13 collects voice in the vicinity and outputs collected voice data to the control unit 10. For example, the microphone 13 continuously collects speech of the plurality of persons who share the location and passes time-series collected voice data to the control unit 10.

The display unit 14 is an example of an output unit and is realized by a display device such as a liquid crystal display (LCD) device or an organic light emitting diode (OLED) display device. For example, the display unit 14 displays the affinity determination result obtained by the affinity determination unit 102. Specific examples of the affinity determination result screen will be described later with reference to FIGS. 8 and 9.

The operation input unit 15 is realized by a touch panel, a switch, a button, or the like, detects a user's operation input, and outputs a detected input signal to the control unit 10.

The affinity level storage unit 16 stores the affinity determination result obtained by the affinity determination unit 102. The affinity level storage unit 16 stores affinity level information for each pair, for example. Specifically, a start time stamp, a completion time stamp, ID-X, ID-Y, a representative image X, a representative image Y, and an affinity level of the pair are associated with each other and stored therein. The start time stamp and the completion time stamp are a start time at which affinity diagnosis is started and a completion time. ID-X and ID-Y are IDs unique to the pair (users X and Y), and for example, are face image IDs. The representative image X and the representative image Y are face images of the user X and the user Y captured when the affinity diagnosis is performed, for example. The representative images may be images with the highest smiling levels from among the face images captured, for example.

In addition, a storage unit including the affinity level storage unit 16 can be realized by a read only memory (ROM) that stores programs, computation parameters, and the like used for processing performed by the control unit 10 and a random access memory (RAM) that temporarily stores parameters and the like that appropriately change.

The configuration of the information processing apparatus 1 has been specifically described above. Note that the configuration illustrated in FIG. 2 is an example, and the embodiment is not limited thereto. For example, the information processing apparatus 1 may use a speaker that reproduces a voice signal, and in such a case, the information processing apparatus 1 can output the affinity determination result with voice. In addition, although the voice data of the plurality of persons is collected by the microphone 13 provided in the information processing apparatus 1 in the aforementioned example, the voice data of the respective persons may be respectively collected by the wearable terminals 2 that the respective persons are wearing and may then be transmitted to the information processing apparatus 1.

<2-2. Configuration of Wearable Terminal 2>

As illustrated in FIG. 2, each wearable terminal 2 has a control unit 20, a communication unit 21, and a sensor 22.

The communication unit 21 transmits and receives data to and from an external device in a wired/wireless manner. For example, the communication unit 21 connects to the information processing apparatus 1 and transmits the time-series data of the vital sign information detected by the sensor 22. In addition, the communication unit 21 may transmit a data analysis result (parameters) obtained by the data analysis unit 201 analyzing the time-series data of the vital sign information detected by the sensor 22. The communication with the information processing apparatus 1 is performed, for example, through Wi-Fi (registered trademark), Bluetooth (registered trademark), infrared communication, near-field wireless communication, or the like.

The control unit 20 functions as a computation processing device and a control device and controls the overall operations in the wearable terminal 2 in accordance with various programs. The control unit 20 is realized by an electronic circuit such as a CPU or a microprocessor, for example. In addition, the control unit 20 according to the embodiment also functions as the data analysis unit 201.

The data analysis unit 201 analyzes the time-series data of the vital sign information detected by the sensor 22 and calculates the parameters. For example, the data analysis unit 101 detects body motion from the acceleration sensor data and calculates time-series data of parameters of motion (for example, nodding movement, body swinging movement, hand moving (gestures) movement, head inclining movement, and the like). The analysis result (the time-series data of the parameters) obtained by the data analysis unit 201 is transmitted from the communication unit 21 to the information processing apparatus 1.

The sensor 22 has a function of detecting various kinds of vital sign information of the person who wears the wearable terminal 2. For example, the sensor 22 includes an acceleration sensor, a vibration sensor, a pulse sensor, a sweating amount sensor, a temperature sensor, a microphone, a camera, and the like.

The configuration of the wearable terminal 2 according to the embodiment has been specifically described above. In addition, the configuration example illustrated in FIG. 2 is an example, and the embodiment is not limited thereto. For example, the wearable terminal 2 may not have the data analysis unit 201, and the time-series data of the vital sign information detected by the sensor 22 may be transmitted from the communication unit 21 to the information processing apparatus 1. In such a case, the data analysis unit 101 of the information processing apparatus 1 performs similar data analysis.

<<3. Operation Processing>>

Figure 3:
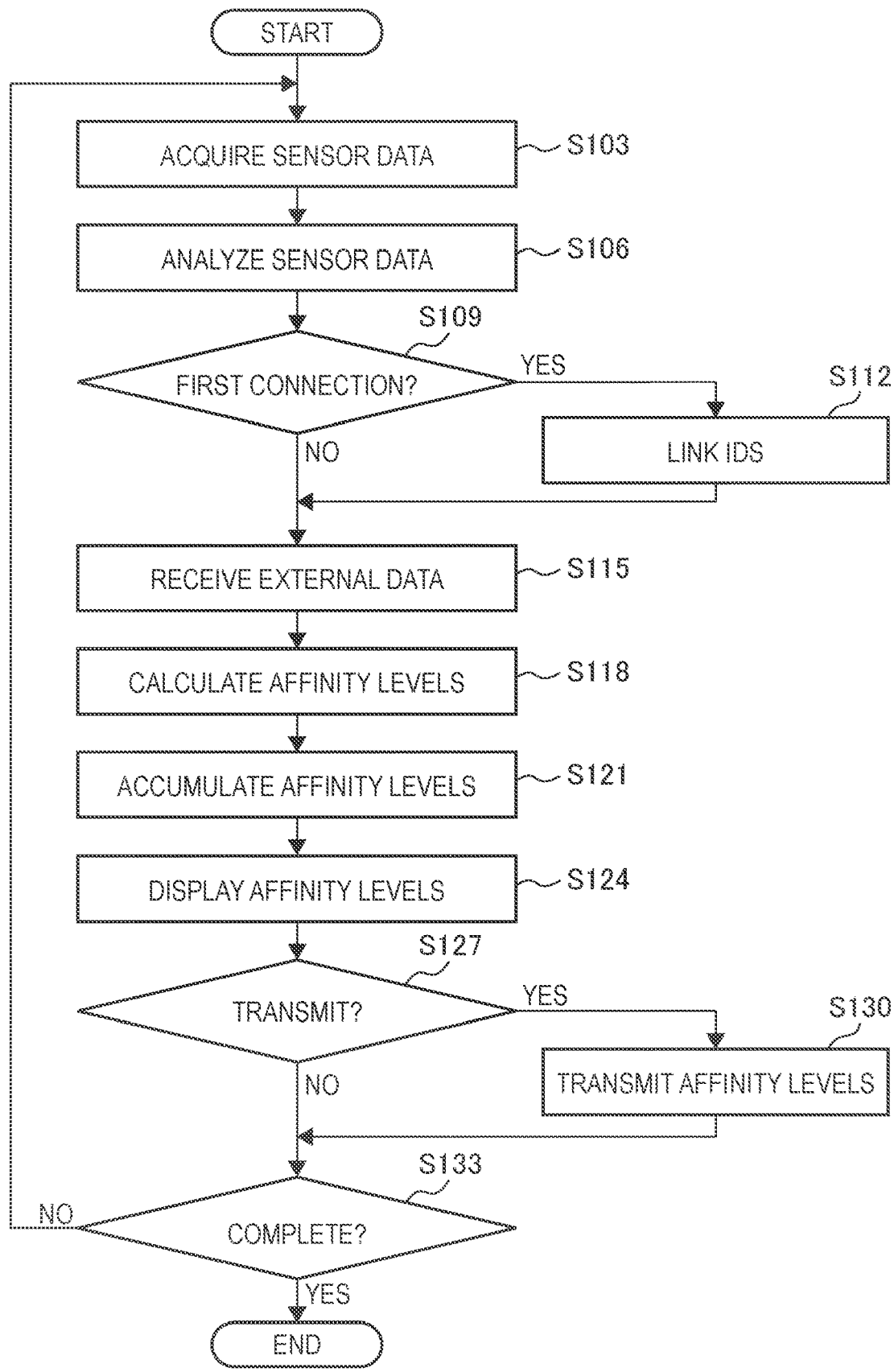
FIG. 3 is a flowchart illustrating affinity determination processing according to the embodiment.

Next, operation processing according to the embodiment will be specifically described with reference to FIG. 3. FIG. 3 is a flowchart illustrating affinity determination processing according to the embodiment.

As illustrated in FIG. 3, the information processing apparatus 1 acquires sensor data first (Step S103). Here, the sensor data from the sensor provided in the information processing apparatus 1 is acquired.

Next, the data analysis unit 101 of the information processing apparatus 1 analyzes the acquired sensor data and calculates parameters of the time-series data (Step S106). An example of specific analysis processing of the sensor data is illustrated in the flowchart in FIG. 4.

Figure 4:
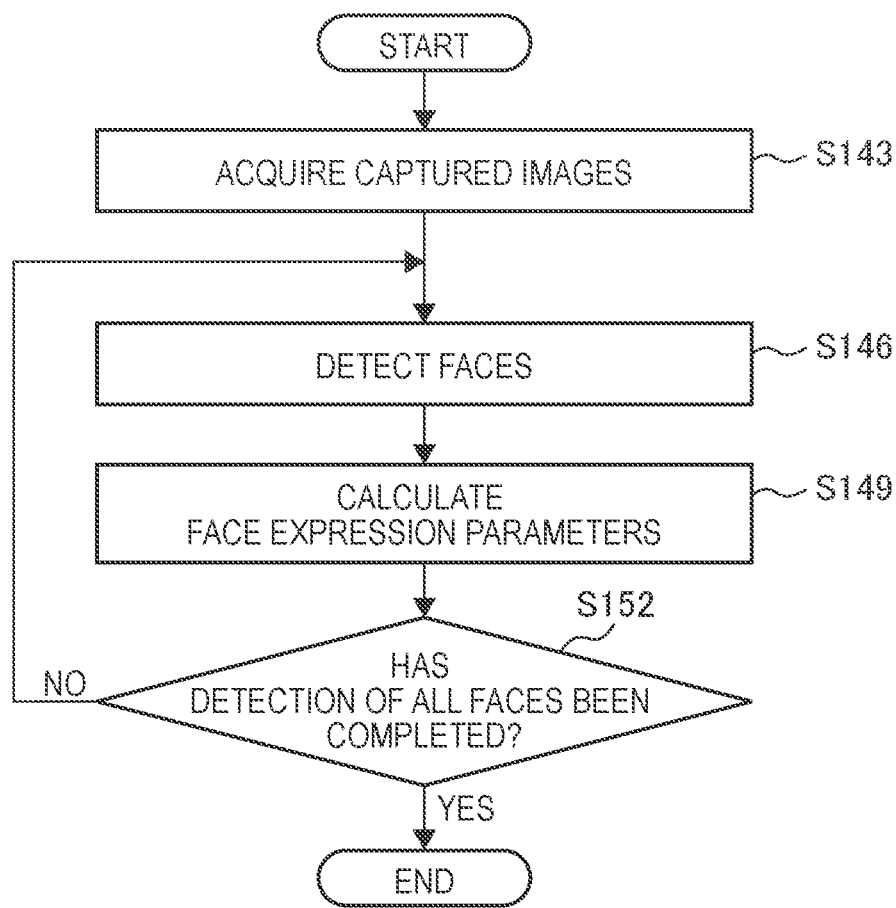
FIG. 4 is a flowchart illustrating an example of specific analysis processing of sensor data according to the embodiment.

FIG. 4 is a flowchart illustrating an example of the specific analysis processing of the sensor data according to the embodiment. The information processing apparatus 1 acquires time-series captured image data captured in a case in which the sensor is the camera 12, for example (Step S143).

Then, the information processing apparatus 1 detects face images from the captured image data by the data analysis unit 101 (Step S146) and calculates emotion face expression parameters such as smiling levels, surprise levels, angriness levels, fear levels, or the like (Step S149).

Then, the information processing apparatul repeats Steps S146 to S149 described above until the detection of all faces from the time-series captured image data acquired is completed (Step S152).

Subsequently, returning to FIG. 3, in a case in which the information processing apparatus 1 establishes first connection with one or more wearable terminals 2 in the vicinity (Step S109/Yes), the control unit 10 performs processing of linking IDs of the wearable terminals 2 with IDs of the persons (Step S112). More specifically, the control unit 10 links IDs of the face images detected from the captured images with the IDs of the wearable terminals 2 that are present in the vicinity. An example of the method of linking the IDs will be described with reference to FIG. 5.

FIG. 5 is a diagram for explaining the method of linking the IDs according to the embodiment. As illustrated in FIG. 5, a face appearing in a captured image 142 that is displayed on the display unit 14 of the information processing apparatus 1 is tapped, and the person of the face shakes his or her arm on which the person are wearing the wearable terminal 2, for example, the control unit 10 of the information processing apparatus 1 links the ID of the wearable terminal 2 with the highest acceleration detected in the sensor data received from the wearable terminals 2 in the vicinity with the ID of the tapped face image. In this manner, the information processing apparatus 1 can link the IDs. The information processing apparatus 1 may display a display 143 surrounding the tapped face image in a superimposed manner as illustrated in FIG. 5 in order to feed back the fact that the face has been tapped to the user. The ID of the wearable terminal 2 is received from the wearable terminal 2. In addition, the ID of the face image is automatically applied when the data analysis unit 101 performs the face detection from the captured images. In addition, the IDs may be linked at the head of the affinity determination processing illustrated in FIG. 3. For example, the information processing apparatus 1 displays a start screen of the affinity determination after linking of all the plurality of persons appearing in the captured images is completed, and starts the affinity determination processing when a start button is tapped.

Although the linking between the face images and the wearable terminals 2 has been described above, the information processing apparatus 1 according to the embodiment can link IDs of speakers detected from voice data collected by the microphone 13 and the IDs of the wearable terminals 2. If a person utters a linking command ("registration" or the like), and the person who utters the command shakes his or her arm on which the person is wearing the wearable terminal 2, for example, the control unit 10 of the information processing apparatus 1 links the ID of the wearable terminal 2 with the highest acceleration detected in the sensor data received from the wearable terminals 2 in the vicinity with the ID of the speaker recognized on the basis of the voice data obtained by collecting the utterance.

Next, in a case in which the information processing apparatus 1 connects to the external wearable terminal 2, the information processing apparatus 1 receives, as external data, time-series parameters detected by the sensors 22 of the wearable terminals 2 and analyzed by the data analysis units 201 (Step S115). For example, time-series data of sound volumes obtained by analyzing voice data from microphones is received as parameters in a case in which the microphones are used as the sensors of the wearable terminals 2, and time-series data of degrees of accelerations from acceleration sensors is received as parameters in a case in which the acceleration sensors are used.

Then, the affinity determination unit 102 of the information processing apparatus 1 calculates affinity levels (Step S118). The affinity determination unit 102 obtains cross-correlations of the time-series parameters and specifies persons who have a same or similar emotional response as persons having a good affinity with each other. Here, an example of the time-series parameters obtained by the data analysis is illustrated in FIG. 6.

Figure 6:
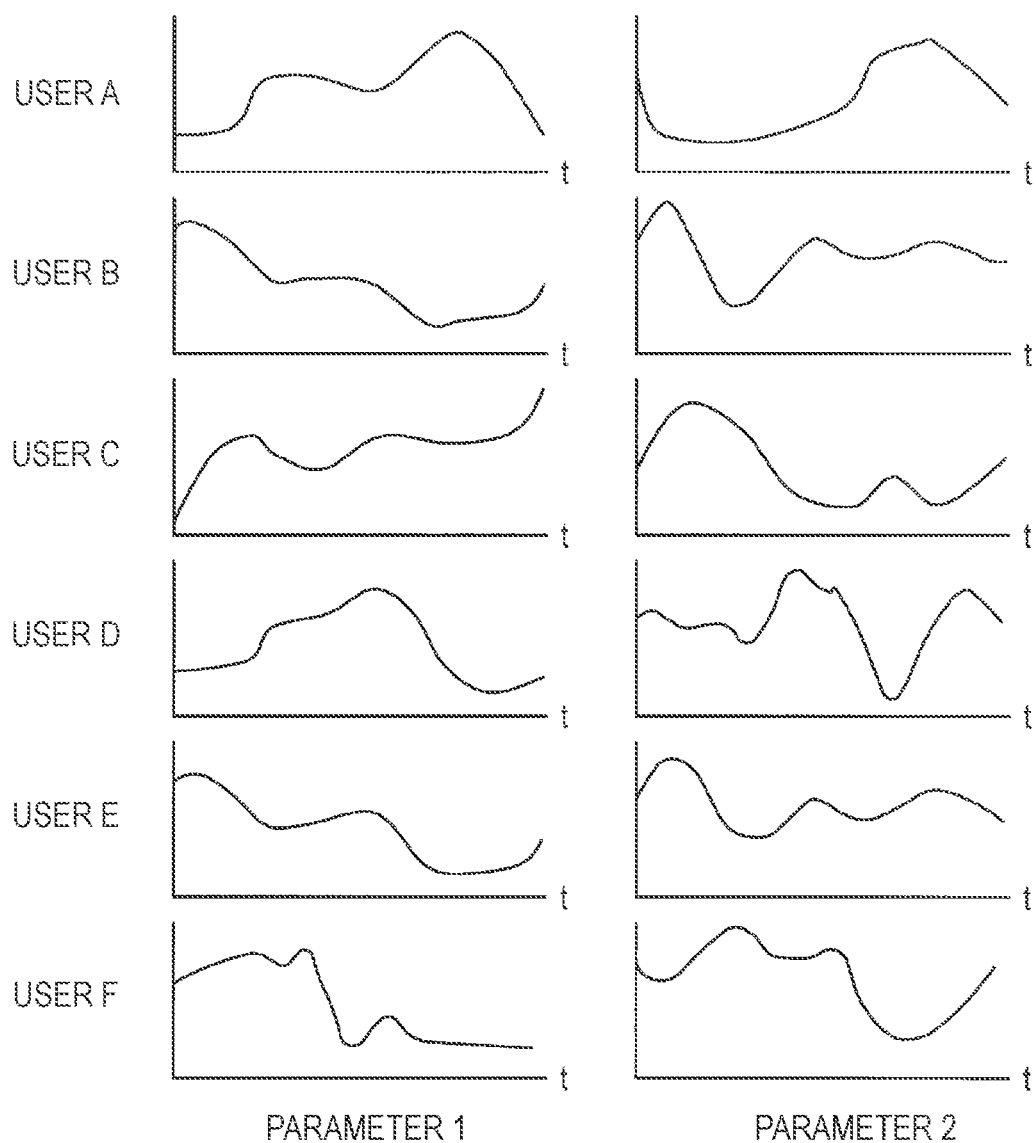
FIG. 6 is a diagram illustrating an example of time-series parameters obtained by data analysis of vital sign information that are acquired from a plurality of persons.

FIG. 6 is a diagram illustrating an example of time-series parameters obtained by data analysis of the vital sign information acquired from a plurality of persons. In addition, noise is removed in advance from the time-series parameters by a low pass filter (LPF) during the data analysis. In the illustrated example, time-series data of a parameter 1 and a parameter 2 acquired for each of the plurality of persons is illustrated. Although two types of parameters are used herein, the embodiment is not particularly limited thereto, and the cross-correlations are obtained on the basis of one or a plurality of time-series parameters. In addition, the two parameters illustrated in FIG. 6 may be time-series data based on data that is respectively acquired from two sensors or may be time-series data based on data that is acquired from one sensor. That is, the parameter 1 may be time-series data of smiling levels of the users A to F based on the face images, and the parameter 2 may be time-series data of how high the accelerations of the users A to F are based on the acceleration data, for example. Alternatively, the parameter 1 may be time-series data of smiling levels of the users A to F based on the face images, and the parameter 2 may be time-series data of surprise levels of the users A to F based on the face images, for example.

The affinity determination unit 102 calculates an affinity (specifically, cross-correlations of the parameters, for example) of the respective persons in accordance with the parameters of the plurality of respective persons as illustrated in FIG. 6.

For example, a cross-correlation C between the user X and the user Y in terms of a time-series parameter k of the sensor is obtained by the following Equation 1.

[Math. 1]

$$C_{XYk} = \Sigma_{t=1}^{T} X(t) Y(t) \quad \text{Equation 1}$$

In addition, in a case in which the cross-correlation is obtained while phase deviation is allowed, the cross-correlation is obtained by the following Equation 2, and the maximum value after phase change is regarded as a value of the cross-correlation C.

[Math. 2]

$$C_{XYk}(\tau) = \Sigma_{t=1}^{T} X(t) Y(t+\tau) \quad \text{Equation 2}$$

The affinity determination unit 102 calculates cross-correlations of the combinations of all the plurality of persons for each of parameters 1 to N. For example, the affinity determination unit 102 calculates fifteen combinations of cross-correlations if the plurality of persons are 6 users A to F. Then, the affinity determination unit 102 obtains an affinity level $COM_{XY}$ between the user X and the user Y by the following Equation 3 by multiplying a weight coefficient $w_k$ for the cross-correlations of the respective parameters.

[Math. 3]

$$COM_{XY} = \Sigma_{k=1}^{N} C_{XYk} w_k \quad \text{Equation 3}$$

In this manner, in the parameter example illustrated in FIG. 6, for example, a cross-correlation of the time-series parameter 1 and a cross-correlation of the parameter 2 between the user B and the user E can be calculated as being high, and an affinity level therebetween can be calculated as being high. In a case in which the parameter 1 is time-series data of the smiling levels, and the parameter 2 is time-series data of how high the accelerations are, for example. It is possible to recognize that the user B and the user E have achieved similar smiling levels and have moved their bodies at the same timing when all the users make speech and to state that both have a similar emotional response. Therefore, the affinity determination unit 102 determines that the user B and the user E have a good affinity in a case in which the affinity level therebetween is relatively high.

In addition, the affinity determination unit 102 according to the embodiment can also calculate affinity levels between persons by using co-occurrence rates instead of the aforementioned cross-correlations. Hereinafter, description will be given with reference to FIG. 7.

FIG. 7 is a diagram for explaining a case in which affinity levels are calculated by using co-occurrence rates according to the embodiment. The affinity determination unit 102 expresses time-series data of the respective parameters obtained by analyzing one or more sensor data pieces as sequences in which values exceeding a threshold value are represented by 1 and values below the threshold value are represented by 0 on the basis of the predetermined threshold value as illustrated in FIG. 7. Then, the affinity determination unit 102 calculates inner products between the sequences of the respective persons, and this means that a cross-correlation has been simply obtained (in addition, phase deviation is not taken into consideration at this time). In a case in which time-series data of parameters of smiling levels is used, for example, the co-occurrence rate herein is obtained by counting the number of times two persons smiles at the same time (smiling levels exceeding a threshold value) in a predetermined time.

Then, returning to FIG. 3, the control unit 10 of the information processing apparatus 1 accumulates information related to affinity levels of pairs calculated by the affinity determination unit 102 in the affinity level storage unit 16 (Step S121).

Next, the control unit 10 displays the affinity level determination result screen on the display unit 14 (Step S124). Here, specific examples of the affinity level determination result screen will be described with reference to FIGS. 8 and 9.

FIG. 8 is a diagram illustrating an example of the affinity level determination result screen according to the embodiment. In the illustrated example, an affinity level determination result screen in which lines 145a, 145b, and 145c connecting pairs with relatively high affinity levels in accordance with the affinity levels are displayed in a superimposed manner on a captured image 144 of a plurality of persons. The control unit 10 may performs control such that the thicknesses of the lines connecting the pairs differ depending on how high the affinity levels are. In such a case, it is possible to recognize that the affinity between the user B and the user E is the best since the line 145a connecting therebetween is the thickest, and it is possible to recognize that the user A and the user F are a pair with the second best affinity since the line 145b connecting therebetween is the second thickest. In addition, it is possible to recognize that the user B and the user C are a pair with the third best affinity since the user B and the user C are connected with the line 145c with the third thickest line 145c. In addition, although the affinity level determination result is displayed without limiting pairs to male and female pairs, it is also possible to perform control such that pairs having a good affinity with each other are explicitly displayed while the pairs are limited to male and female pairs. In addition, a method of displaying the affinity level determination result is not limited to the example illustrated in FIG. 8, the control unit 10 may perform display while surrounding faces of two persons with high affinity level by lines of the same color on a captured image of a plurality of persons, for example. In addition, a ranking form (see FIG. 1) in accordance with affinity levels of the respective pairs may be employed. In the example illustrated in FIG. 1, representative images (the respective face images, for example) of the respective pairs may also be displayed.

Figure 9:
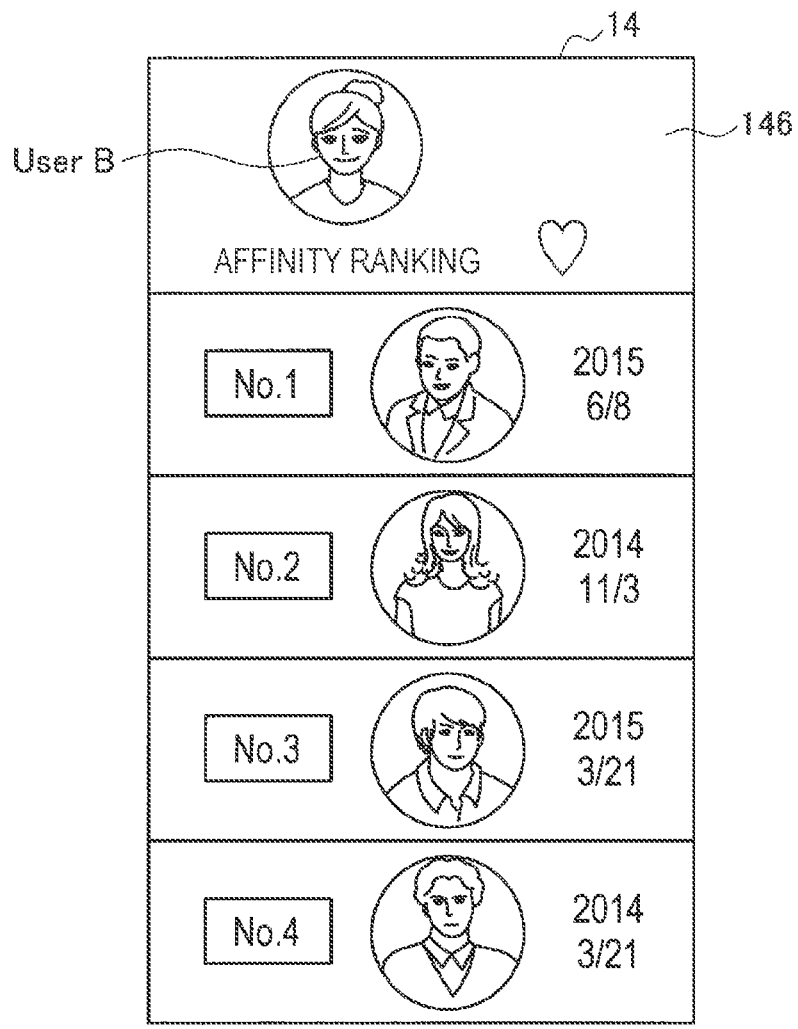
FIG. 9 is a diagram illustrating another example of the affinity level determination result screen according to the embodiment.

FIG. 9 is a diagram illustrating another example of the affinity level determination result screen according to the embodiment. In the illustrated example, an affinity level determination result screen 146 representing an affinity level determination result between a specific user and other users in a ranking form is displayed on the display unit 14. The affinity level determination result screen 146 illustrated in FIG. 9 displays ranking of counterparts having a good affinity with a user himself/herself, for example, on the basis of past affinity level information accumulated. In a case in which sexes can be employed as parameters of face expressions of faces, ranking of affinities with females may be displayed for males while ranking of affinities with males may be displayed for females. Dates are displayed on the basis of time stamps included in the affinity level information stored.

Next, returning to FIG. 3, in a case in which a user's operation input to transmit the affinity level determination result displayed on the display unit 14 to an external device is provided (Step S127/Yes), the control unit 10 of the information processing apparatus 1 performs control to transmit the affinity level determination result to the designated external device via the communication unit 11 (Step S130), and Steps S103 to S130 described above are repeated until the affinity determination processing is completed (Step S133). Here, transmission of the affinity level determination result to the external device will be described with reference to FIGS. 10 to 13.

Figure 10:
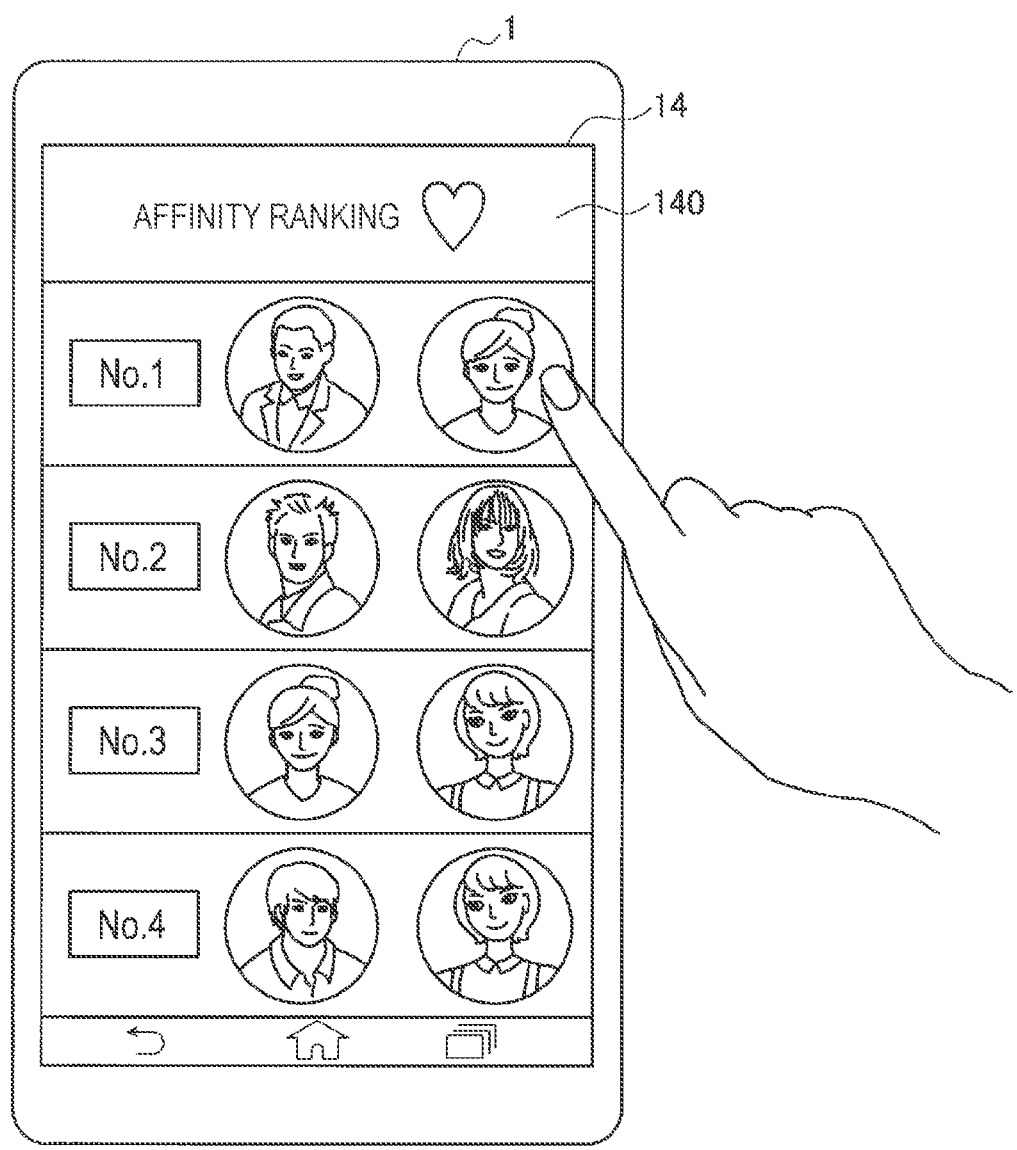
FIG. 10 is a diagram for explaining an example of a user's operation for providing an instruction for transmitting affinity levels according to the embodiment.
Figure 11:
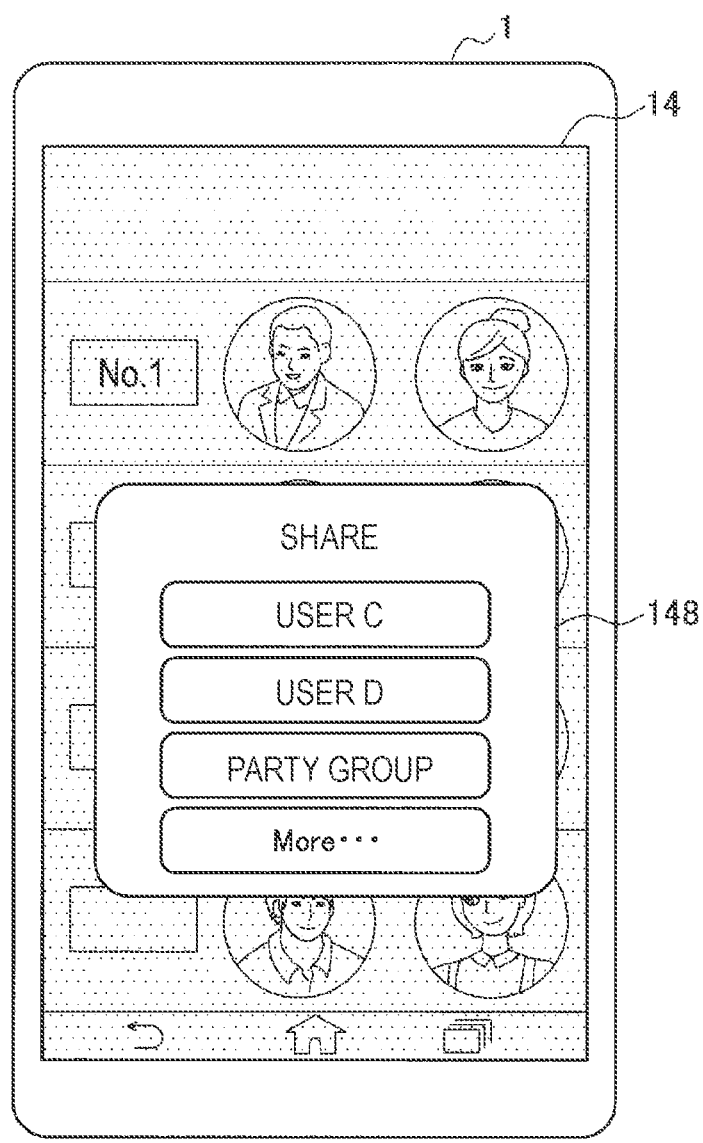
FIG. 11 is a diagram for explaining an example of a user's operation for providing an instruction for transmitting affinity levels according to the embodiment.

FIGS. 10 and 11 are diagrams for explaining an example of a user's operation to provide an instruction for transmitting the affinity levels according to the embodiment. In a case in which the affinity ranking screen 140 is displayed on the display unit 14 of the information processing apparatus 1, for example, as illustrated in FIG. 10, a sharing target list 148 is displayed in a popped-up manner as illustrated in FIG. 11 if a display region of a ranking top is tapped. The sharing target list 148 shows last counterparts and groups with which messages are exchanged, for example. If a user selects a "party group", for example, in the sharing target list 148, a display screen of the ranking top selected in FIG. 10 is transmitted to chatting of the "party group", and viewing from information processing apparatuses of members who have registered the "party group" becomes available. In addition, the information processing apparatus 1 may automatically determine counterparts set in advance as sharing targets and transmit the affinity level determination result thereto. In a case in which users or groups with which a message related to affinity determination are to be shared are set in advance, for example, a linked messenger is automatically activated if a face image is selected in the affinity ranking, and a message input screen with set counterpart is displayed such that the affinity determination result can be transmitted.

Figure 12:
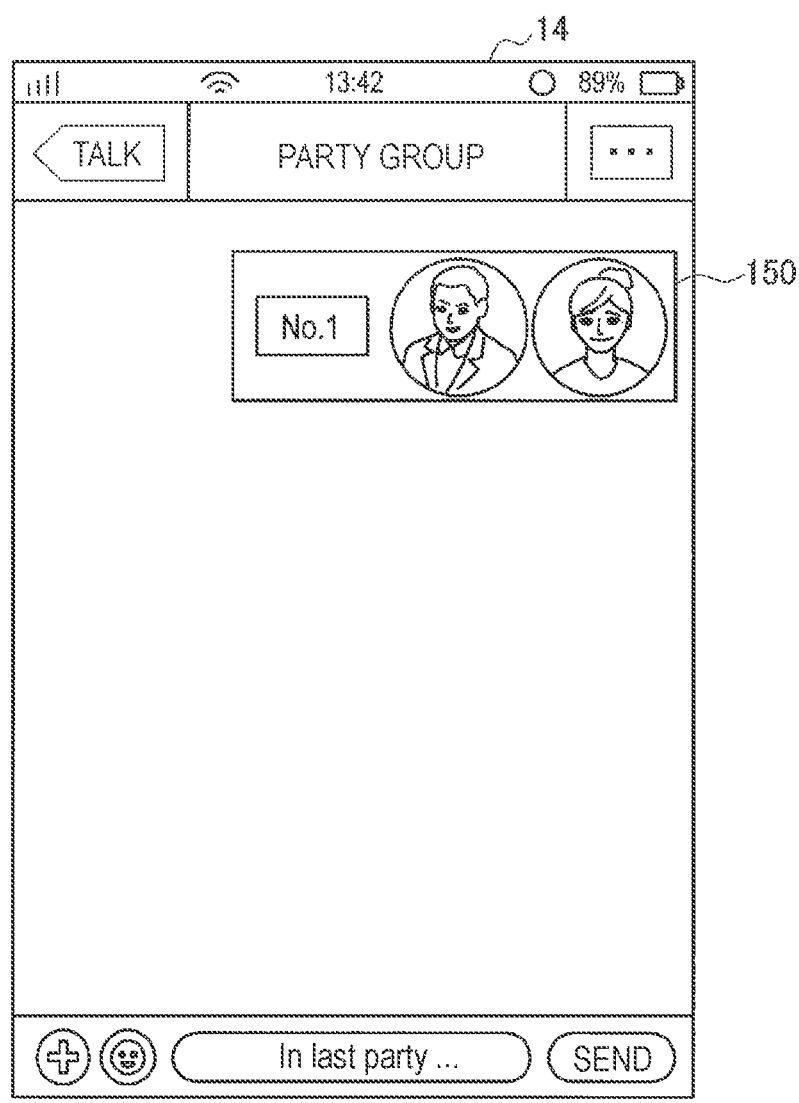
FIG. 12 is a diagram for explaining sharing of an affinity level determination result according to the embodiment.
Figure 13:
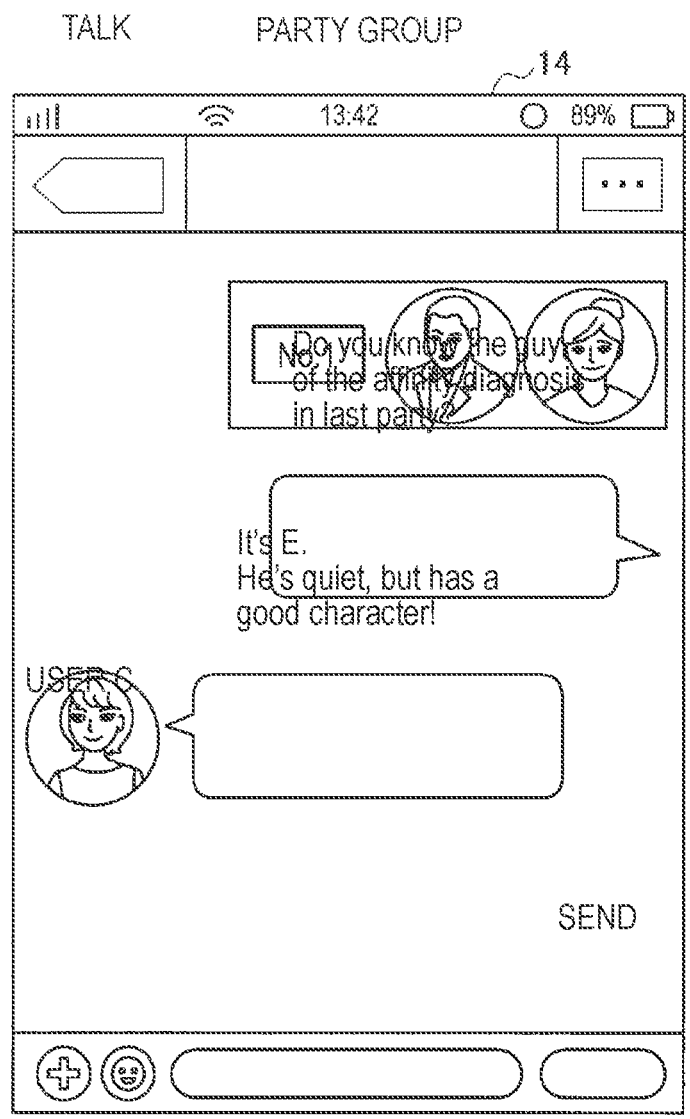
FIG. 13 is a diagram for explaining sharing of an affinity level determination result according to the embodiment.

FIGS. 12 and 13 are diagrams for explaining sharing of the affinity level determination result according to the embodiment. In the case in which the "party group" has been selected as a sharing target as described above, for example, an image 150 of the ranking top in the affinity level determination result selected by the user in FIG. 10 is automatically displayed on a chatting screen of the party group such that viewing by the chatting members become available. In a case in which the "party group" is a group of users A to C who have participated in the affinity determination, for example, the user B can send an affinity level determination result (including face images of both) with a counterpart, with whom the user B has been determined to have a good affinity, whom the user B does not know well, to persons who seems to know the counterpart and can perform communication by sharing the image of the affinity ranking and using the image as a topic as illustrated in FIG. 13. In addition, in a case in which a counterpart of high affinity ranking has been registered as a friend of a friend in a social communication tool, such as a messenger, a message can be directly sent. According to the embodiment, it is possible to automatically and more precisely determine an affinity of persons who have met for the first time in a party or the like in accordance with parameters of time-series vital sign information in a predetermined time and to provide a notification of counterparts having a good affinity with the user as described above. Also, it is possible to provide a service of finding and introducing counterparts having a good affinity with the user by enabling an affinity determination result including face images of the counterparts to be shared with friends and obtaining information about the counterparts from the friends, enabling messages to be sent directly in a case in which the counterparts have been registered as friends of the friends, and so on, even in a case in which the user does not know well the counterparts that the user has a good affinity with.

The specific display example of the affinity determination result has been described above. In addition, the control unit 10 can also cause the affinity determination result to be displayed as a graph on the basis of a past affinity level history stored in the affinity level storage unit 16. Hereinafter, description will be given with reference to FIGS. 14 and 15.

Figure 14:
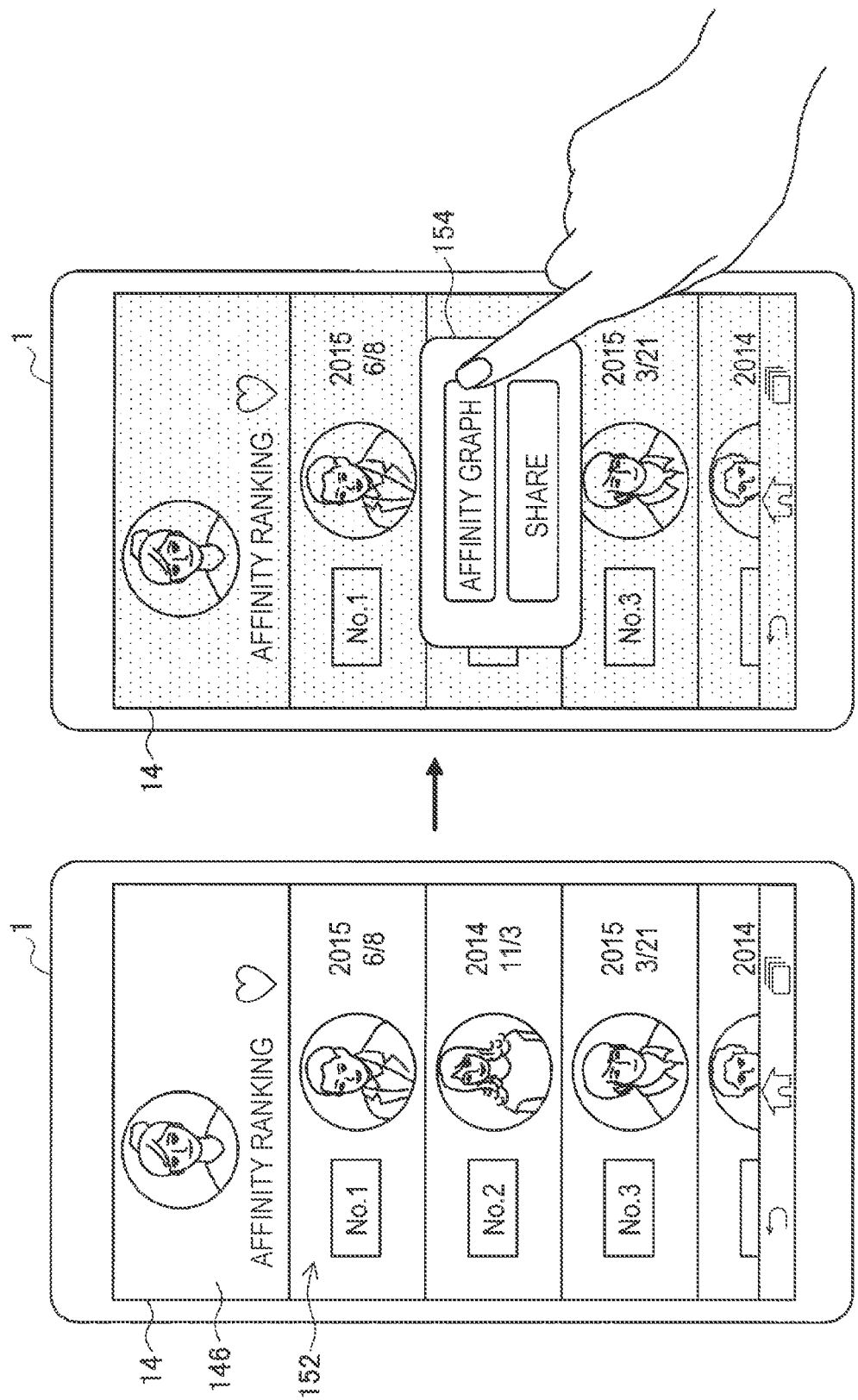
FIG. 14 is a diagram for explaining a case in which graph display is performed according to the embodiment.

FIG. 14 is a diagram for explaining a case in which graph display is performed according to the embodiment. If a display region 152 in which a counterpart with the affinity level No. 1, for example, is displayed is tapped, in a case in which the affinity level determination result screen 146 is displayed on the display unit 14 as illustrated on the left side in FIG. 14, a menu screen 154 is displayed in a popped up manner as illustrated on the right side in FIG. 14. If an "affinity graph" is selected in the menu screen 154, the control unit 10 searches past affinity level information between the user and the designated counterpart (searches by using a user ID, for example) from the affinity level storage unit 16, generates an affinity graph, and performs control such that the affinity graph is displayed on the display unit 14. Here, an example of the graph display of the affinity levels is illustrated in FIG. 15.

Figure 15:
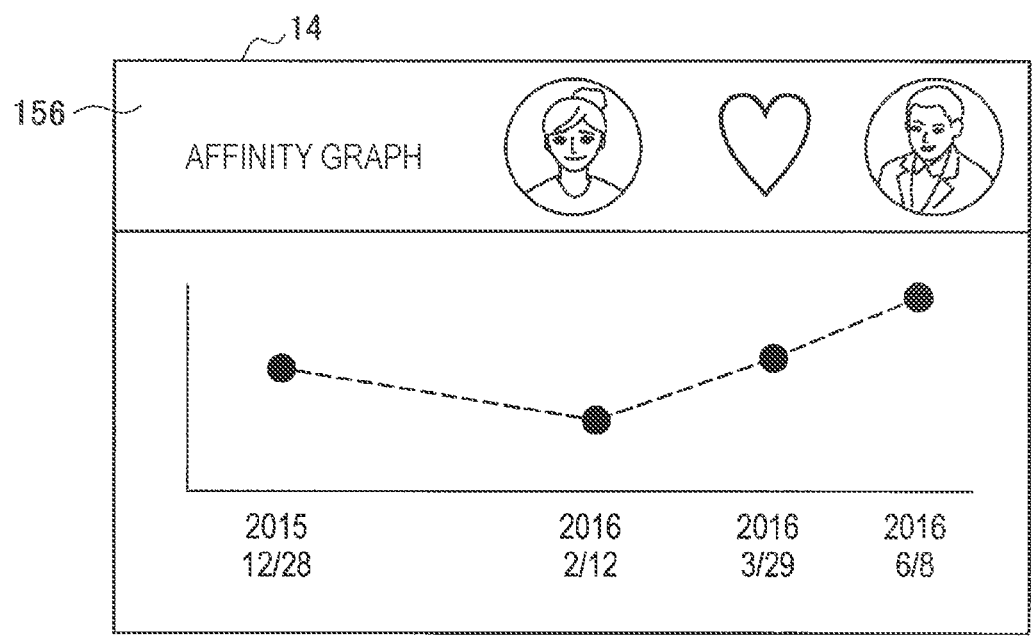
FIG. 15 is a diagram illustrating an example of graph display of affinity levels based on a past history according to the embodiment.

As illustrated in FIG. 15, the affinity graph image 156 shows a change in the affinity level between the user and the designated counterpart based on the past history. Since the affinity level information accumulated in the affinity level storage unit 16 includes a time stamp, the graph can be generated on the basis of this. In this manner, it is possible to intuitively recognize a change in the affinity level with the counterpart after a predetermined period of time has passed since the first meeting, for example.

<<4. Application Examples>>

<4-1 Example of Single Body Configuration>

Although the configuration of the information processing system including the information processing apparatus 1 and the wearable terminals 2 as illustrated in FIG. 2 has been described in the aforementioned embodiment, the present disclosure is not limited thereto, and the information processing system may include a single body of the information processing apparatus 1. That is, it is possible to acquire time-series data of a plurality of persons who share a location only with various sensors, such as the camera 12 or the microphone 13, of the information processing apparatus 1 and to calculate affinity levels, without connection with the wearable terminal 2. Hereinafter, operation processing of the information processing apparatus 1 according to the application example will be described with reference to FIG. 16.

Figure 16:
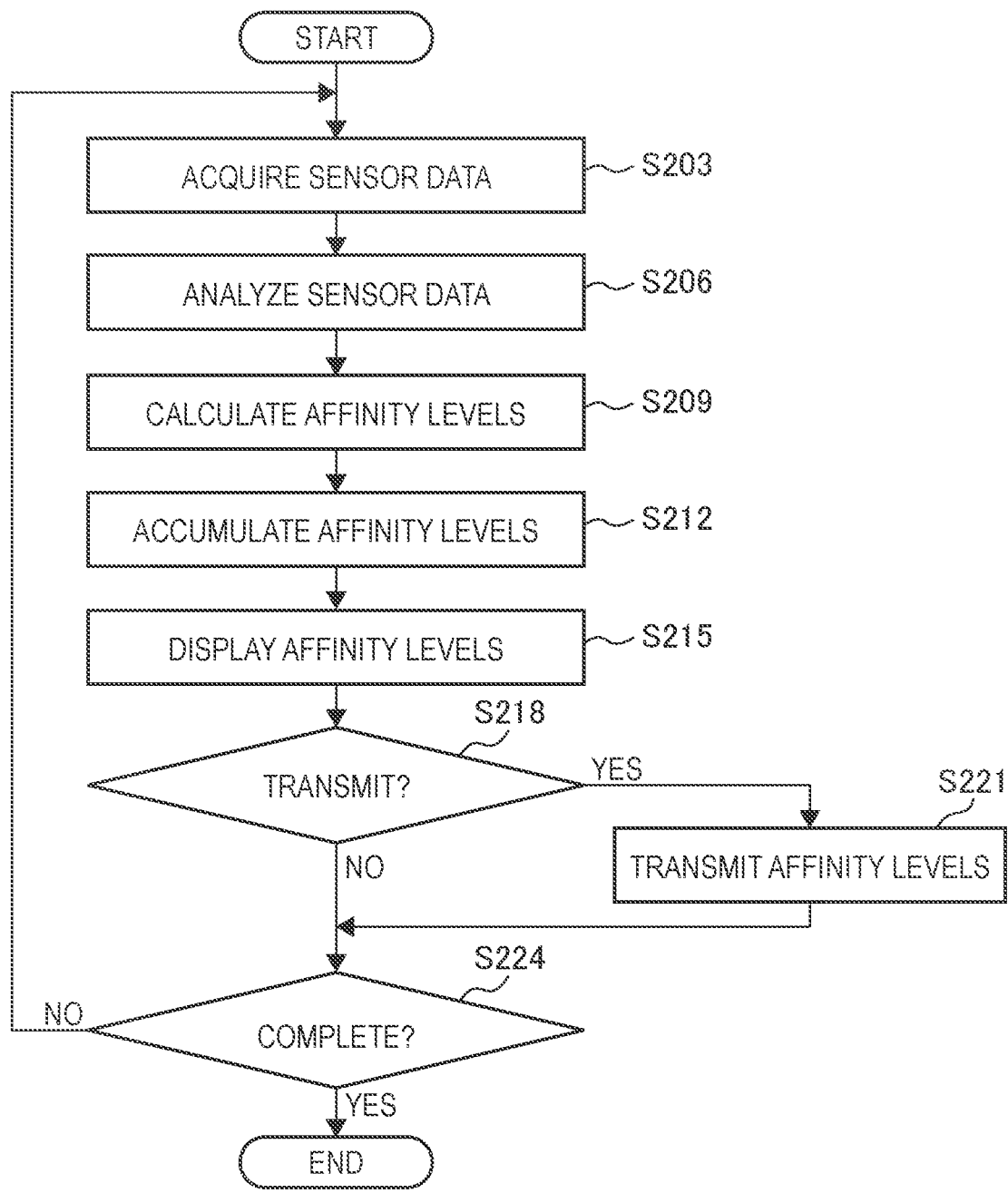
FIG. 16 is a flowchart illustrating affinity determination processing according to an application example of the embodiment.

FIG. 16 is a flowchart illustrating the affinity determination processing according to the application example of the embodiment. Processing in S203 to S224 illustrated in FIG. 16 is similar to Steps S103, S106, and S118 to S113 described with reference to FIG. 3.

That is, the information processing apparatus 1 acquires sensor data from the camera 12 or the microphone 13 (Step S203), calculates parameters of time-series data (Step S206), and calculates affinity levels (Step S209) in the application example. Then, the information processing apparatus 1 accumulates the calculated affinity levels (Step S212), also displays the affinity determination result (Step S215), and transmits the affinity levels to the outside if there is an instruction from the user (Step S221). Then, the information processing apparatus 1 repeats Steps S203 to S221 described above until the affinity determination processing is completed (Step S224). Since detailed content of the respective processing is similar to that of the processing described with reference to FIG. 3, description thereof will be omitted here.

As described above, the information processing system according to the embodiment can be realized by the single body of the information processing apparatus 1.

In addition, the information processing system according to the embodiment may have a configuration including the information processing apparatus 1 or the information processing apparatus 1 and the wearable terminals 2, and a server. In such a case, the configurations corresponding to the data analysis unit 101, the affinity determination unit 102, and the affinity level storage unit 16 described above, for example, are provided on the server side. The server connects to the information processing apparatus 1 via a network, acquires time-series data indicating vital sign information of a plurality of persons who share a location form the information processing apparatus 1, performs affinity determination between the respective persons, and replies the result.

<4-2. Digital Signage with Camera>

Although a smartphone for an individual is used as an example of the information processing apparatus 1 in the aforementioned embodiment, the present disclosure is not limited thereto, and the information processing apparatus 1 can also be realized by a digital signage with a camera, for example. Hereinafter, description will be given with reference to FIG. 17.

Figure 17:
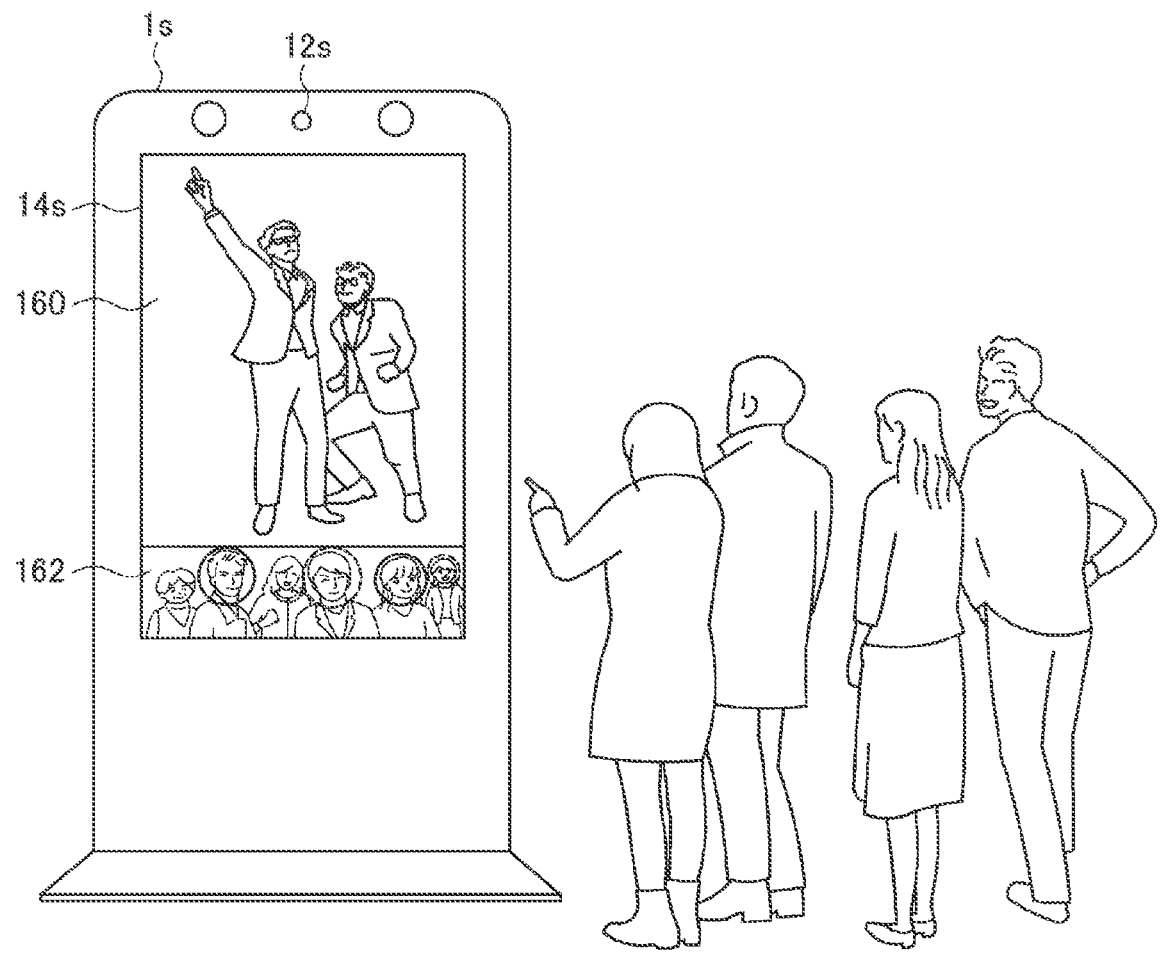
FIG. 17 is a diagram for explaining digital signage with a camera according to another application example of the embodiment.

FIG. 17 is a diagram for explaining a digital signage with a camera according to another application example of the embodiment. As illustrated in FIG. 17, a digital signage 1*s* has a camera 12*s* and a display unit 14*s*. The digital signage 1*s* can reproduce content by the display unit 14*s*, continuously images persons who are viewing the content by the camera 12*s*, and perform affinity determination between the respective persons in the vicinity who are viewing the content.

Specifically, the digital signage 1*s* analyzes time-series captured image data captured by the camera 12*s*, extracts time-series face expression parameters for each face image appearing the captured images, and performs affinity determination between the plurality of respective persons appearing the captured images. The affinity determination processing is similar to that in the aforementioned embodiment, and determination can be made from cross-correlations of the parameters of the time-series data, for example. The result of the affinity determination can be explicitly shown by respectively surrounding faces of pairs having a good affinity with each other by lines with the same color in a captured image of persons in the vicinity captured by the camera 12*s*, for example. In the example illustrated in FIG. 17, a content screen 160 and a captured image 162 are displayed on the display unit 14*s*, and faces of a pair having a good affinity with each other are respectively surrounded by lines with the same color on the captured image 162 (Note that the faces of the pair with the good affinity are respectively represented by the same line type in the drawing).

In this manner, persons who are watching the content reproduced by the digital signage 1*s* can intuitively recognize a pair having a good affinity with each other (that is, high empathy) who laugh at the same timing, who are impressed at the same time, and the like. In addition, the affinity determination by the digital signage 1*s* is not limited to affinity determination performed on pairs and may be affinity determination performed on groups of three or more persons.

<<4. Conclusion>>

As described above, the information processing system according to the embodiment of the present disclosure can more precisely specify an affinity between persons by using time-series data.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to produce a computer program to cause hardware, such as a CPU, a ROM, and a RAM, incorporated in the aforementioned information processing apparatus 1 or the wearable terminal 2 to exhibit functions of the information processing apparatus 1 or the wearable terminal 2. In addition, a computer-readable storage medium that stores the computer program is also provided.

In addition, the affinity determination according to the embodiment is not limited to the affinity determination performed on pairs, and it is also possible to perform affinity determination on groups of three or more persons.

In addition, the embodiment may make it possible to present persons having a good affinity with other users, such as favorite persons or competitors, to the user in accordance with charging to the user in a case in which the user desires to see the persons having a good affinity with each other.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

an acquisition unit that acquires time-series data representing vital sign information of a plurality of persons who share a location in a predetermined time; and a control unit that specifies persons who have a same or similar emotional response as persons having a good affinity with each other in accordance with the time-series data acquired by the acquisition unit.

(2)

The information processing system according to (1), in which the control unit specifies persons who have a same or similar emotional response in accordance with cross-correlations in the time-series data representing the vital sign information of the plurality of persons.

(3)

The information processing system according to (2), in which the time-series data is time-series data of facial expression parameters extracted from face images of each person.

(4)

The information processing system according to (3), in which the control unit specifies persons who have a similar emotional response in accordance with a co-occurrence rate of a specific facial expression based on the facial expression parameters in the face images of the each person.

(5)

The information processing system according to (2), in which the time-series data is time-series data of sound volume parameters extracted from voices of each person.

(6)

The information processing system according to (2), in which the time-series data is time-series data of vibration parameters representing motions of each person.

(7)

The information processing system according to any one of (1) to (6), in which the time-series data is detected by a wearable terminal worn by each person.

(8)

The information processing system according to (7), in which the control unit performs processing of linking an ID of the wearable terminal with an ID of a face image of each person.

(9)

The information processing system according to any one of (1) to (8), in which the control unit calculates an affinity level between the persons in accordance with the time-series data representing the vital sign information of the plurality of persons.

(10)

The information processing system according to (9), in which the control unit applies a predetermined weight in accordance with a parameter to a cross-correlation value of the time-series data representing the vital sign information of the plurality of persons, then calculates an affinity level between persons, and specifies persons who have a higher affinity level as the persons having a more similar emotional response.

(11)

The information processing system according to (9) or (10), in which the control unit causes a line image that links persons with a relatively high affinity level to be superimposed on a captured image that includes the persons.

(12)

The information processing system according to (9) or (10), in which the control unit generates a ranking display image representing how good affinities between persons are in accordance with the affinity levels by using face images of the respective persons.

(13)

The information processing system according to (12), in which the control unit is able to transmit a face image selected from the ranking display image as a message to a specific user.

(14)

The information processing system according to any one of (9) to (13), in which the control unit generates a graph representing a time-series change in an affinity level between specific persons.

(15)

An information processing method including:
acquiring, by a processor, time-series data representing vital sign information of a plurality of persons who share a location in a predetermined time; and
specifying, by a processor, persons who have a same or similar emotional response as persons having a good affinity with each other in accordance with the acquired time-series data.

(16)

A storage medium that stores a program for causing a computer to function as:
an acquisition unit that acquires time-series data representing vital sign information of a plurality of persons who share a location in a predetermined time; and
a control unit that specifies persons who have a same or similar emotional response as persons having a good affinity with each other in accordance with the time-series data acquired by the acquisition unit.

REFERENCE SIGNS LIST 1 information processing apparatus
10 control unit
101 data analysis unit
102 affinity determination unit
11 communication unit
12, 12s camera
13 microphone
14, 14s display unit
15 operation input unit
16 affinity level storage unit
2 wearable terminal
20 control unit
21 communication unit
22 sensor

What is claimed is:

1. An information processing system, comprising: hardware circuitry configured to:
acquire time-series data from a plurality of wearable terminals, wherein
a wearable terminal of the plurality of wearable terminals is worn by a person of a plurality of persons,
the plurality of persons is at a specific physical location at a specific time,
the time-series data comprises acceleration data detected by each wearable terminal of the plurality of wearable terminals, and
the acceleration data is associated with body motions of each of the plurality of persons;
link an identifier (ID) of a specific wearable terminal of the plurality of wearable terminals to an ID associated with a specific person of the plurality of persons, wherein the ID of the specific wearable terminal and the ID associated with the specific person are linked based on at least one acceleration value obtained from the acceleration data, and each acceleration value of a plurality of acceleration values is associated with each person of the plurality of persons;
determine that at least one person of the plurality of persons as having an affinity with the specific person, wherein the determination is based on
similar emotional responses of the at least one person and the specific person that exceed a threshold value, and
the acquired time-series data including the acceleration data; and notify the specific person with information regarding the at least one person having the similar emotional responses.

2. The information processing system according to claim 1, wherein the determination is based on cross-correlations in the time-series data associated with the plurality of persons.

3. The information processing system according to claim 1, wherein the time-series data further comprises time-series data of facial expression parameters extracted from facial images of each person of the plurality of persons.

4. The information processing system according to claim 3, wherein the determination is based on a co-occurrence rate of a specific facial expression based on the facial expression parameters extracted from the facial images of each person of the plurality of persons.

5. The information processing system according to claim 1, wherein the time-series data further comprises time-series data of sound volume parameters extracted from voices of each person of the plurality of persons.

6. The information processing system according to claim 1, wherein the time-series data further comprises time-series data of vibration parameters representing the body motions of each person of the plurality of persons.

7. The information processing system according to claim 1, wherein the time-series data is detected by the plurality of wearable terminals.

8. The information processing system according to claim 1, wherein the hardware circuitry is further configured to calculate an affinity level between the specific person and the at least one person based on the time-series data.

9. The information processing system according to claim 1, wherein the determination comprises applying a specific weight, based on a parameter, to a cross-correlation value of the time-series data.

10. The information processing system according to claim 9, wherein the hardware circuitry is further configured to superimpose a line image, which links the specific person and the at least one person with a specific affinity level, on a captured image that includes the specific person and the at least one person.

11. The information processing system according to claim 8, wherein the hardware circuitry is configured to generate a ranking display image corresponding to the affinity level between the specific person and the at least one person, based on affinity levels calculated from facial images of the specific person and the at least one person.

12. The information processing system according to claim 11, wherein the hardware circuitry is further configured to:
select a first facial image from the ranking display image; and
transmit the selected first facial image as a message to a specific user.

13. The information processing system according to claim 1, wherein the hardware circuitry is further configured to generate a graph representing a time-series change in an affinity level between the specific person and the at least one person.

14. An information processing method, comprising:
acquiring time-series data from a plurality of wearable terminals, wherein
a wearable terminal of the plurality of wearable terminals is worn by a person of a plurality of persons,
the plurality of persons is at a specific physical location at a specific time,
the time-series data comprises acceleration data detected by each wearable terminal of the plurality of wearable terminals, and
the acceleration data is associated with body motions of each of the plurality of persons;
linking an identifier (ID) of a specific wearable terminal of the plurality of wearable terminals to an ID associated with a specific person of the plurality of persons, wherein
the ID of the specific wearable terminal and the ID associated with the specific person are linked based on at least one acceleration value obtained from the acceleration data, and
each acceleration value of a plurality of acceleration values is associated with each person of the plurality of persons;
determining that at least one person of the plurality of persons as having an affinity with the specific person, wherein the determination is based on
similar emotional responses of the at least one person and the specific person that exceed a threshold value, and
the acquired time-series data including the acceleration data; and
notifying the specific person with information regarding the at least one person having the similar emotional responses.

15. A non-transitory computer-readable medium having stored thereon, computer-executable instructions, which when executed by a computer, cause the computer to execute operations, the operations comprising:
acquiring time-series data from a plurality of wearable terminals, wherein
a wearable terminal of the plurality of wearable terminals is worn by a person of a plurality of persons,
the plurality of persons is at a specific physical location at a specific time,
the time-series data comprises acceleration data detected by each wearable terminal of the plurality of wearable terminals, and
the acceleration data is associated with body motions of each of the plurality of persons;
linking an identifier (ID) of a specific wearable terminal of the plurality of wearable terminals to an ID associated with a specific person of the plurality of persons, wherein
the ID of the specific wearable terminal and the ID associated with the specific person are linked based on at least one acceleration value obtained from the acceleration data, and
each acceleration value of a plurality of acceleration values is associated with each person of the plurality of persons;
determining that at least one person of the plurality of persons as having an affinity with the specific person, wherein the determination is based on
similar emotional responses of the at least one person and the specific person that exceed a threshold value, and
the acquired time-series data including the acceleration data; and
notifying the specific person with information regarding the at least one person having the similar emotional responses.

* * * * *